(12) United States Patent
Mehra et al.

(10) Patent No.: US 11,508,173 B2
(45) Date of Patent: Nov. 22, 2022

(54) MACHINE LEARNING PREDICTION AND DOCUMENT RENDERING IMPROVEMENT BASED ON CONTENT ORDER

(71) Applicant: ADOBE INC., San Jose, CA (US)

(72) Inventors: Ashutosh Mehra, Noida (IN); Vlad Ion Morariu, Potomac, MD (US); Kajal Gupta, Noida (IN); Jayant Vaibhav Srivastava, Noida (IN); Curtis Michael Wigington, San Jose, CA (US); Tushar Tiwari, Noida (IN)

(73) Assignee: ADOBE INC., San Jose, CA (US)

( * ) Notice: Subject to any disclaimer, the term of this patent is extended or adjusted under 35 U.S.C. 154(b) by 378 days.

(21) Appl. No.: 16/669,144

(22) Filed: Oct. 30, 2019

(65) Prior Publication Data
US 2021/0133439 A1    May 6, 2021

(51) Int. Cl.
*G06K 9/00* (2022.01)
*G06V 30/414* (2022.01)
*G06N 3/02* (2006.01)
*G06K 9/62* (2022.01)
*G06N 20/00* (2019.01)

(52) U.S. Cl.
CPC ......... *G06V 30/414* (2022.01); *G06K 9/6267* (2013.01); *G06N 3/02* (2013.01); *G06N 20/00* (2019.01)

(58) Field of Classification Search
CPC .... G06V 30/10; G06V 30/414; G06V 10/242; G06V 30/1463; G06V 30/412; G06V 30/1478; G06V 10/22; G06V 30/1444; G06V 10/247; G06V 30/268; G06V 30/153; G06V 10/20; G06V 10/225; G06V 30/287; G06V 20/62; G06V 10/40; G06V 30/244; G06V 30/1448; G06V 30/224; G06V 30/413; G06V 10/30; G06V 30/416; G06V 10/243; G06T 5/006; G06T 2207/30176; G06T 3/0031; G06T 5/00; G06T 7/00; G06K 9/62; G06K 9/6218; G06K 9/00; G06K 9/6282
See application file for complete search history.

(56) References Cited

U.S. PATENT DOCUMENTS

2013/0021629 A1 * 1/2013 Kurilin ............... H04N 1/3878
358/1.9
2019/0164313 A1 * 5/2019 Ma ....................... G06K 9/6218

FOREIGN PATENT DOCUMENTS

JP           3554097 B2 *  8/2004
WO     WO-2014174932 A1 * 10/2014  .......... G06K 9/4642

* cited by examiner

*Primary Examiner* — Quan M Hua
(74) *Attorney, Agent, or Firm* — Shook, Hardy & Bacon L.L.P.

(57) ABSTRACT

Various disclosed embodiments can resolve output inaccuracies produced by many machine learning models. Embodiments use content order as input to machine learning model systems so that they can process documents according to the position or rank of instances in a document or image. In this way, the model is less likely to misclassify or incorrectly detect instances or the ordering between predicted instances. The content order in various embodiments can be used as an additional signal to classify or make predictions.

20 Claims, 13 Drawing Sheets
(1 of 13 Drawing Sheet(s) Filed in Color)

FIG. 4.

MACHINE LEARNING PREDICTION AND DOCUMENT RENDERING IMPROVEMENT BASED ON CONTENT ORDER

BACKGROUND

Advancements in software and hardware platforms have led to a variety of improvements in systems that utilize machine learning models to make particular predictions, such as classifying digital images or detecting objects within documents. For example, neural network systems (e.g., convolutional neural networks) can perform object detection for various features of a document. Despite these advances, machine learning systems and other vision-based systems suffer from a number of disadvantages, particularly in terms of their accuracy. Consequently, machine learning models often misclassify or wrongly detect objects within documents.

SUMMARY

One or more embodiments described herein provide benefits and solve one or more of the foregoing or other problems in existing technology with methods, systems, and non-transitory computer readable media that generate content order values or scores. Various disclosed embodiments can resolve output inaccuracies (e.g., misclassifications, content localization, etc.) produced by many machine learning models. Embodiments can use content order as input to machine learning model systems so that they can process documents according to the position or rank of objects in a document or image. In this way, the model is less likely to misclassify or incorrectly detect instances. The content order in various embodiments can be used as an additional signal to classify or make predictions. For example, a vision-based model can correctly classify a foreground instance and background instance of an image as different instances because it processes a Z-order score or value indicative of the instances being two different instances.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present invention is described in detail below with reference to the attached drawing figures, wherein:

FIG. 4 is a schematic diagram of an example document with various instances, illustrating content order values that are superimposed over the instances, according to some embodiments.

DETAILED DESCRIPTION

Overview

Figure 1:
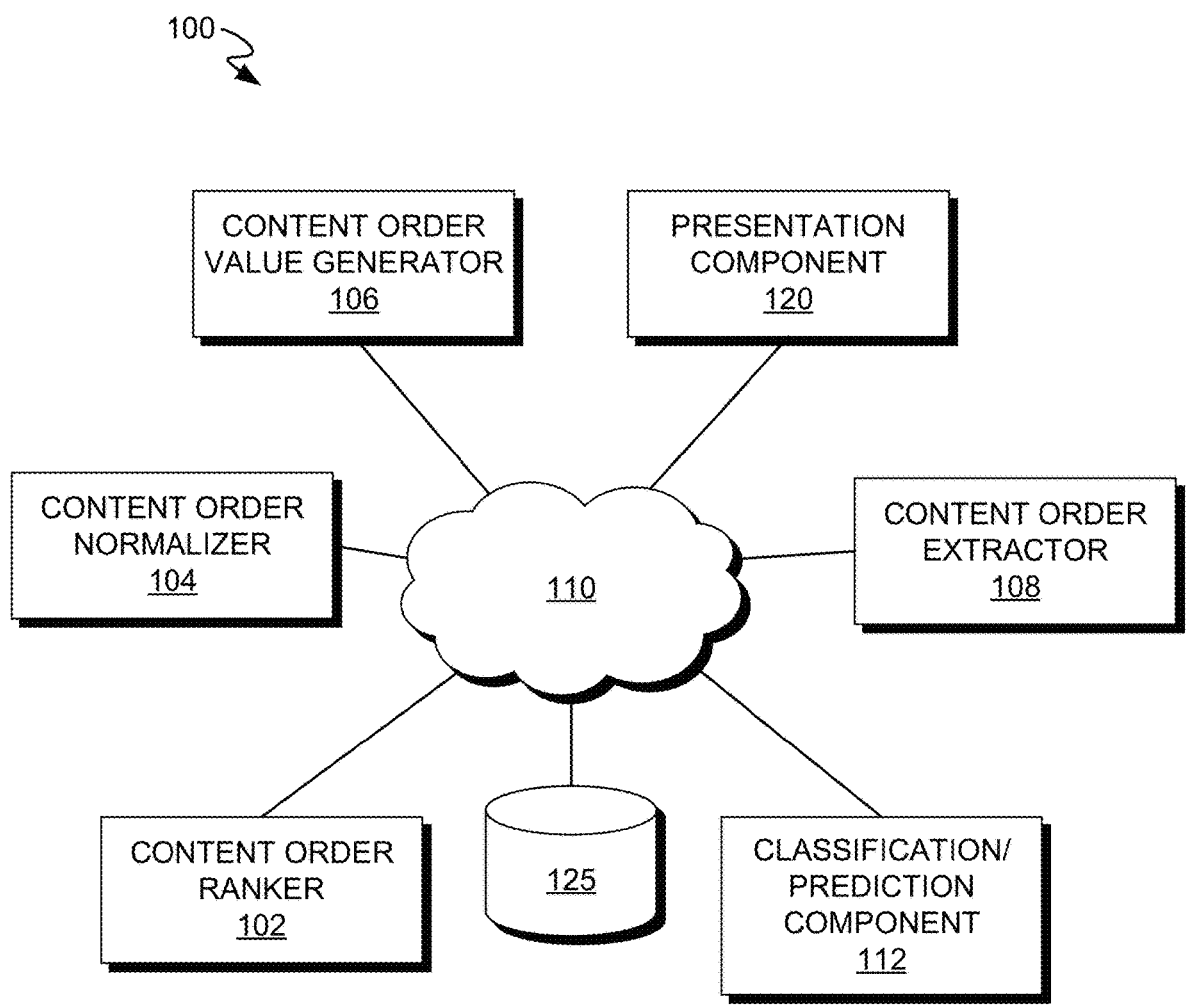
FIG. 1 is a block diagram of a computing system architecture in which aspects of the present disclosure are employed, according to some embodiments.

Existing technologies that make predictions, detections, or classifications have various shortcomings. For example, some machine learning models wrongly detect instances or misclassify instances because existing models may have trouble determining what instances (e.g., lines of text) should be combined to form a single instance (e.g., a table) or what instances should remain separate instances and not combined as a result of not having any indication of content order. Although some technologies use heuristics-based algorithms to obtain the correct reading order of instances, no existing machine learning model uses content order as an input feature to help classify, detect, or otherwise make a prediction. A heuristic is typically a hand-coded function that is not a model generated via training on a data set. Heuristic solutions typically require subject matter experts to help manually define variables. Heuristic solutions are manually-driven and tedious to write. Moreover, these solutions are difficult to maintain and are not scalable when compared to machine learning algorithms.

Embodiments of the present invention relate to generating content order scores or values for instances within a document and causing machine learning systems to process documents based at least in part on content order. In this way, detection, classification, or prediction is more likely to be accurate than models that do not use content order. Machine learning models can be trained using documents with content order values and subsequent to the training, machine learning models are used to analyze documents. In operation, a machine learning system can receive a document that has a plurality of instances. A content order score can be generated for each instance of the plurality of instances. For example, if a document contained several instances that represent lines of text in 3 paragraphs, the system can generate content order scores by ranking each line of text, which is indicative of the natural language reading order of the instances. This is to say that a human would first read the first paragraph and corresponding lines of text, then read the second paragraph after the first paragraph and corresponding lines of text, and then read the third paragraph after the second paragraph and corresponding lines of text. Accordingly, embodiments can generate content order scores by using a set of rules that ranks each line of text instance from top to bottom and/or left to right based on the content stream of the document reflecting the order a human might read the document.

In some embodiments, subsequent to the generating of the content order score the system can generate a content order value within the document that reflects or indicates the content order score. For example, using the illustration above, the system can color code or encode all of the lines of text within the first paragraph with varying yellow pixel values, encode all the lines of text in the second paragraph with varying orange pixel values, and encode all the lines of text in the third paragraph with varying red pixel values.

In some embodiments, subsequent to the generating of the content order value within the document or subsequent to the generating of the content order scores, the document (e.g., encoded with the content order values or scores) is fed or provided to a machine learning model component for detection, classification, or prediction. The machine learning model can use the content order score and/or value as a signal to detect, classify, or predict. For example, using the illustration above, a deep CNN can extract the content order scores and/or values from the document to determine that the three paragraphs are different instances based on the scores or values being different over a threshold for each paragraph. Based on this determination and/or other detection criteria (e.g., texture, line symmetry, enclosure, etc.), the system can detect that the three paragraphs are separate or distinct individual paragraph instances, as opposed to a single paragraph instance. Existing technologies often wrongly classify groups of paragraphs or other instances together as the same instance or otherwise incorrectly classify instances without the use of content order. This can be because prediction and classification are typically based on static spatial orientation between individual instances without regard to a content stream for example, such as natural language reading order of instances. Content order adds an additional signal to classification or prediction such that classification or prediction is more accurate. Content order not only helps detect or classify instances, but helps to predict the ordering between instances for which content order is useful as input. For example, some embodiments predict that a first instance comes after a second instance in a particular reading order. The machine learning model can be trained using these documents that have content order scores and/or values, thereby making prediction more likely to be accurate.

Various embodiments of the present disclosure thus improve conventional technologies by increasing the accuracy of detection, classification, and prediction of machine learning models. For example, FIGS. 9A through 9D and FIGS. 4 through 8 described below demonstrate these improvements over existing models. Some embodiments of the present disclosure also provide improvement over other solutions, such as heuristic solutions, because they are more scalable and are more accurate. Moreover, some embodiments improve computing resource consumption, such as CPU utilization and memory consumption. Training CNNs with content order indicators, for example, reduces training data and computing resources needed. Training CNNs and other models with content order indicators reduces processing time, CPU execution (e.g., fetch and decode) and computing resource consumption to make correct predictions, classifications, or detections. That is to say, there are fewer rounds or stages of tuning and training to make correct predictions by using content order as input.

Definitions

Various terms are used throughout, some of which are described below:

In particular embodiments, an "image" as described herein is a visual representation of one or more portions of the real world or a visual representation of one or more documents. For example, an image can be a digital photograph, a digital image among a sequence of video segments, a graphic image file (e.g., JPEG, PNG, etc.), a picture (or sub-element of a picture), and/or a bitmap among other things.

In some embodiments, a "document" as described herein is any medium that includes one or more types of data, such as text, images, and/or graphics (e.g., a PDF document with text and/or pictures). For example, a document can be a digital file that includes text data (e.g., words, sentences, paragraphs, and/or symbols) and/or digital photographs. In some embodiments, however, an image is or includes a document and vice versa. In various embodiments, machine learning systems can be or include computer vision systems that perform object recognition or detection of various objects on a medium, whether the medium is an image and/or document.

In particular embodiments, an "object" or "instance" is a sub-portion or element of an image, document, or other content for which object detection occurs (e.g., a tree object within a larger image of a forest of trees). For example, in computer vision applications, an object can include a bounding box and/or everything within the bounding box. A bounding box describes or defines the boundaries of the instance in terms of the position (e.g., 2-D or 3-D coordinates) of the bounding box. For example, the bounding box can be a rectangular box that is determined by its x and y axis coordinates. This gives object recognition systems indicators of the spatial distinction between instances to help detect the instances. Similarly, an instance in a document can be any sub-component of a document (e.g., word (or set of words), paragraph (or set of paragraphs), column, foreground, background, table, etc.).

A "content order score" or "content order" is a score (e.g., an integer or other real number) or rank of a particular instance or object instance in relation to other instances or object instances. In some embodiments, the content order is at least partially indicative of an order that a respective instance is oriented within an image or document compared to other instances. For example, instances that appear at a beginning of a document are scored higher than instances that appear at the middle or bottom of a page. Alternatively or additionally, in some embodiments, the content order corresponds to the exact order of instances that a human would read the instances if reading a document from beginning to end (e.g., top-to-bottom and left-to-right). For example, if the instances are or include individual paragraphs in a larger body of text, each paragraph can be tagged with a content order score indicating its order of natural language reading. In an illustrative example, a first paragraph is ranked first (e.g., because it is typically read first), a second paragraph is ranked second (e.g., because it is typically read second right after the first paragraph), and a third paragraph is ranked third (e.g., because it is typically read third right after the second paragraph). Alternatively or additionally, in some embodiments, content order correspond to depth discriminator values between instances, such as Z-order values. Z-order refers to the order of objects along the Z-axis. For example, Z-order can provide values for instances that indicate whether an instance is in the foreground or background.

In some embodiments, the content order alternatively or additionally corresponds to an indication of a particular quantity of difference between each instance of a plurality of instances. In this way, the instances need not correspond to a particular order of orientation within an image, which may not be necessary to indicate for some instances that have a certain similar order orientation, but should be marked as clearly distinct, such as a foreground and background instance. In an illustrative example, a document may have two columns, which include two paragraphs at the top of the document that are very close to one another and separated by a very thin marking representing a break in the columns. However, these paragraphs may be two very different paragraphs that are to be read in a very different natural language reading order and therefore it may be desirable to mark these two paragraphs with different content order scores over a threshold indicating a strong difference between the two instances even though they are spatially close together.

In some embodiments, the content order score alternatively or additionally corresponds to the order in which particular instances are to be processed or received by a machine learning model. For example, if a first instance is processed or received by a model at an early stage and a second instance is processed or received by a model at a threshold stage later than the early stage, then the machine learning model can predict that the two instances are not part of the same instance. In this manner, the disclosed embodiments can improve accuracy, such as classification, tagging, object detection, and content localization, among other things. In some embodiments, content order corresponds to the order in which the corresponding portions of content (e.g., text, vector, images, etc.) appear in the page "content stream."

In particular embodiments, a "content order value" is generated within the document or image. In some embodiments, the content order value is an indicator to a machine learning model to process each instance within the document or image according to the content order. In some embodiments, the content order value reflects or represents the content order score (but need not carry the exact same value as a content order score). For example, each instance of a document can include a different color (e.g., red, blue, and green) representing the specific content order score (e.g., three different integers). A machine learning model can then extract the value and make predictions or classifications based on the content order value (or score). In some embodiments, the content order value distinguishes each instance in a document so that a machine learning model can predict the correct reading order of instances or the instances themselves. For example, the content order value can be a value (e.g., a pixel value) superimposed or otherwise input over an already-existing document. This is to say an original document may already have pixel or text values but content order values may be another set of values superimposed or placed within the original document to distinguish the instances. Thus in some embodiments the content order values are not the original values within a document.

The term "machine learning model" refers to a model that is used for machine learning tasks or operations. A machine learning model can analyze one or more input messages. In various embodiments, a machine learning model can receive an input and, based on the input, identify patterns or associations in order to predict a given output (e.g., predict that a message input will have a particular conversion rate). Machine learning models can be or include any suitable model, such as one or more: neural networks (e.g., CNN), word2Vec models, Bayesian networks, Random Forests, Boosted Trees, etc. "Machine learning" as described herein, and in particular embodiments, corresponds to algorithms that parse or extract features of historical data (e.g., instances of documents), learn (e.g., via training) about the historical data by making observations or identifying patterns in data, and then receive a subsequent input (e.g., a current document) in order to make a determination, prediction, and/or classification of the subsequent input based on the learning without relying on rules-based programming (e.g., conditional statement rules). Exemplary System Referring now to FIG. 1, a block diagram is provided showing aspects of an example computing system architecture suitable for implementing an embodiment of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1200 of FIG. 12). Alternatively, some or each of the components may be distributed among various computing devices, such as in a distributed cloud computing environment. In some embodiments, the system 100 and each of the components are located within the server and/or user device of FIG. 11, as described in more detail herein.

The system 100 includes network 110, which is described in connection to FIG. 11, and which communicatively couples components of system 100, including the content order ranker 102, the content order normalizer 104, the content order value generator 106, the presentation component 120, the content order extractor 108, and the classification/prediction component 112. The components of the system 100 may be embodied as a set of compiled computer instructions or functions, program modules, computer software services, logic gates, or an arrangement of processes carried out on one or more computer systems.

It should be understood that the system 100 shown in FIG. 1 is an example of one system in which embodiments of the present disclosure may be employed. Each component shown may include one or more computing devices similar to the computing device 1200 described with reference to FIG. 12. The system 100 should not be interpreted as having any dependency or requirement related to any single module/component or combination of modules/components illustrated therein. Each may comprise a single device or multiple devices cooperating in a distributed environment. For instance, the system 100 may comprise multiple devices arranged in a distributed environment that collectively provide the functionality described herein. Additionally, other components not shown may also be included within the network environment. It should be understood that the system 100 and/or its various components may be located anywhere in accordance with various embodiments.

The system 100 generally operates to generate a content order score and/or value for one or more instances of a document or image and cause a machine learning model to detect or classify each instance based at least in part on the content order score and/or value. For example, the system 100 can generate a content order score for two paragraphs in a document, which is indicative of the two paragraphs being over a threshold difference or not being topologically or geometrically close to each other for processing. Accordingly, a machine learning model may extract this input so as to not classify these two paragraphs as being the same paragraph.

The content order ranker 102 ranks each instance of a document or image and/or generates a content order score for each instance. For example, if a document contained 12 paragraphs, each paragraph may be ranked 1 through 12 according to the order in which the paragraphs are typically read in natural language (e.g., first paragraph ranked first because it is the first paragraph to be read, second paragraph ranked second because it is the second paragraph to be read after the first paragraph, and so on). In various embodiments, content order scores are generated automatically without user input. For example, the content order ranker 102 can use a set of rules or policies to automatically generate content order scores. These rules or policies may progressively rank each instance or portion of a document as a scan, which is done going from left to right and/or top to bottom. In this way for example, as soon as a document is received by the content order ranker 102, it can start progressively ranking each portion of a document as it scans the document going from top to bottom and right to left. In some embodiments, content order scores are alternatively generated manually based on user input. In these embodiments, the content order ranker 102 receives user or developer input indicative of a rank or content order score of one or more instances. For example, a user may create a hash table or other data structure (e.g., similar to the table 300) to populate values indicative of a rank/score of a particular instance of a document, which can then be used as input into a machine learning model. In some embodiments, the content order ranker 102 is representative of the "content order ranker means" as described herein.

The content order normalizer 104 normalizes values, such as normalizing the score or rank generated by the content order ranker 102. In various instances normalization is indicative of adjusting values measured on different scales to a common scale without distorting differences in the range of values. For example, using the illustration above, each of the ranks 1 through 12 can be normalized between the values of 0 and 1 for each instance where 0 or a value substantially close to 0 corresponds to the "1" rank and the 1 value or value substantially close to 1 corresponds to the "12" rank generated by the content order ranker 102. In this way, the closer a value is to 0, the lower the score or rank and the closer the value is to 1, the higher the score or rank. In various instances, normalization is applied as part of data preparation for machine learning. The difference in scale of numbers (e.g., 1 to 1 million) may cause problems when large numbers, for example, are attempted to be combined during modeling. Normalization avoids these problems by generating new values that can maintain the general distribution and ratios of scores or ranks, while keeping values within a scale applied across all numeric data used in a model.

The content order value generator 106 generates content order values. In some embodiments, the content order value generator 106 generates content order values based on the content order scores or ranks for each instances. In some embodiments, the content order value is provided directly on a document or image (e.g., as a particular pixel value color within an instance of a document). In some embodiments, the content order value is generated by linearly combining the content order score or rank with another value. For example, the normalized rank or score can be multiplied by a color value maximum to obtain the content order value. For grey-scale images, a pixel value is a single number that represents the brightness of a pixel, such as a byte image, where the number is stored as an 8-bit integer giving a range of possible values from 0 to 255. The value 255 can represent white while the value 0 can represent the darkest black in the greyscale images. For Red-Green-Blue (RGB) the pixel value can be a single number that represents a particular color (or shade of color). Red, green, and blue may each have integer values from 0 to 255, making a possibility of 16777216 (256*256*256) colors.

In some embodiments, each content order score or rank is multiplied (e.g., by the content order value generator 106) by either 255 (if grey scale) or 16777216 (if RGB scale) to arrive at the correct pixel value that is drawn or superimposed on the canvas of the document (e.g., the content order value). For example, if the content normalizer 104 generated a score of 0.2 for a first instance (e.g., paragraph) of a document, and a gray-scale scheme is used, 0.2 is multiplied by 255 to arrive at a content order value of 51. In another example, if the content order normalizer 104 generated a score of 0.99 for a second instance of the same document, and the same gray-scale scheme is used, 0.99 is multiplied by 255 to arrive at a content order value of 252.45, indicating that the second instance is much lighter in color than the first instance. This disparity between values may indicate that the two instances are different instances and should not be detected or classified as the same instance, such as by a machine learning model.

The content order extractor 108 extracts or receives the content order score and/or content order value in preparation for processing by a machine learning model. For example, in some embodiments, the content order extractor 108 is a component of a machine learning model that receives a document and extracts the content order value and corresponding instance as input in order to classify or detect instances. In this way, this input can be a feature, such as a column or attribute of a data set. For example, the content order value can be a value in a feature vector, which represents an object. In an illustrative example, in order to detect or classify an image, the features may be: circumference of object, shape of object, stem length, color of object, and content order value/score. Each value of each feature may be indicative of belonging a particular label or classification.

The classification/prediction component 112 classifies or makes predictions (e.g., detects object instances and/or predicts the reading order of each object). In some embodiments, the classification/prediction component 112 is a machine learning component that makes predictions based at least in part on the content order score and/or value. For example, using the illustration above, the machine learning system can predict or otherwise make a classification to determine whether an instance is a labeled object based on the values of all of the features, including the content order score or content order value. In another example, the machine learning system can detect whether two instances are part of the same instance or different based on several features, including the content order score and/or content order value. In various embodiments, the classification/prediction component 112 is part of a machine learning system or object detection network (e.g., Region Convolutional Neural Networks (R-CNN), You-Only-Look-Once (YOLO) models, or Single Shot MultiBox Detector (SSD)), as described in more detail herein. In another example, the classification/prediction component 112 can predict the natural language reading order between instances. In some embodiments, the classification/prediction component 112 is representative of the "classification or prediction means" as described herein.

Example system 100 also includes storage 125. Storage 125 generally stores information including data, computer instructions (e.g., software program instructions, routines, or services), and/or models (e.g., machine learning models) used in embodiments of the technologies described herein. In an embodiment, storage 125 comprises a data store (or computer data memory), such as a database of structured data or data store of semi-structured or non-structured data. Further, although depicted as a single data store component, storage 225 may be embodied as one or more data stores or may be in the cloud.

In some embodiments, the predictive features and resultant patterns and models may be determined using pattern inferences logic within the storage 125. Pattern inferences logic may include rules, associations, conditions, predictions, object detection models, and/or classification models, or pattern inference algorithms. The pattern inferences logic can take many different forms depending on the particular pattern or the mechanism used to identify feature similarity among observed documents or images to determine the pattern. For example, some embodiments of pattern inferences logic may employ machine learning mechanisms to determine feature similarity, or other statistical measures to determine or detect an instance based at least in part on generating a content order score or value.

The presentation component 120 functions to render various interfaces and various other outputs generated by the system 100 and the components thereof in a format that can be displayed on user devices. By way of example, the presentation component 120 may render or caused to be displayed a user interface indicating content order scores, and/or documents with such content order values. Alternatively or additionally, the presentation component 120 may render an image or document with detected object instances or classifications, such as bounding boxes superimposed over object instances with a level of confidence and classification of each object instance.

Figure 2:
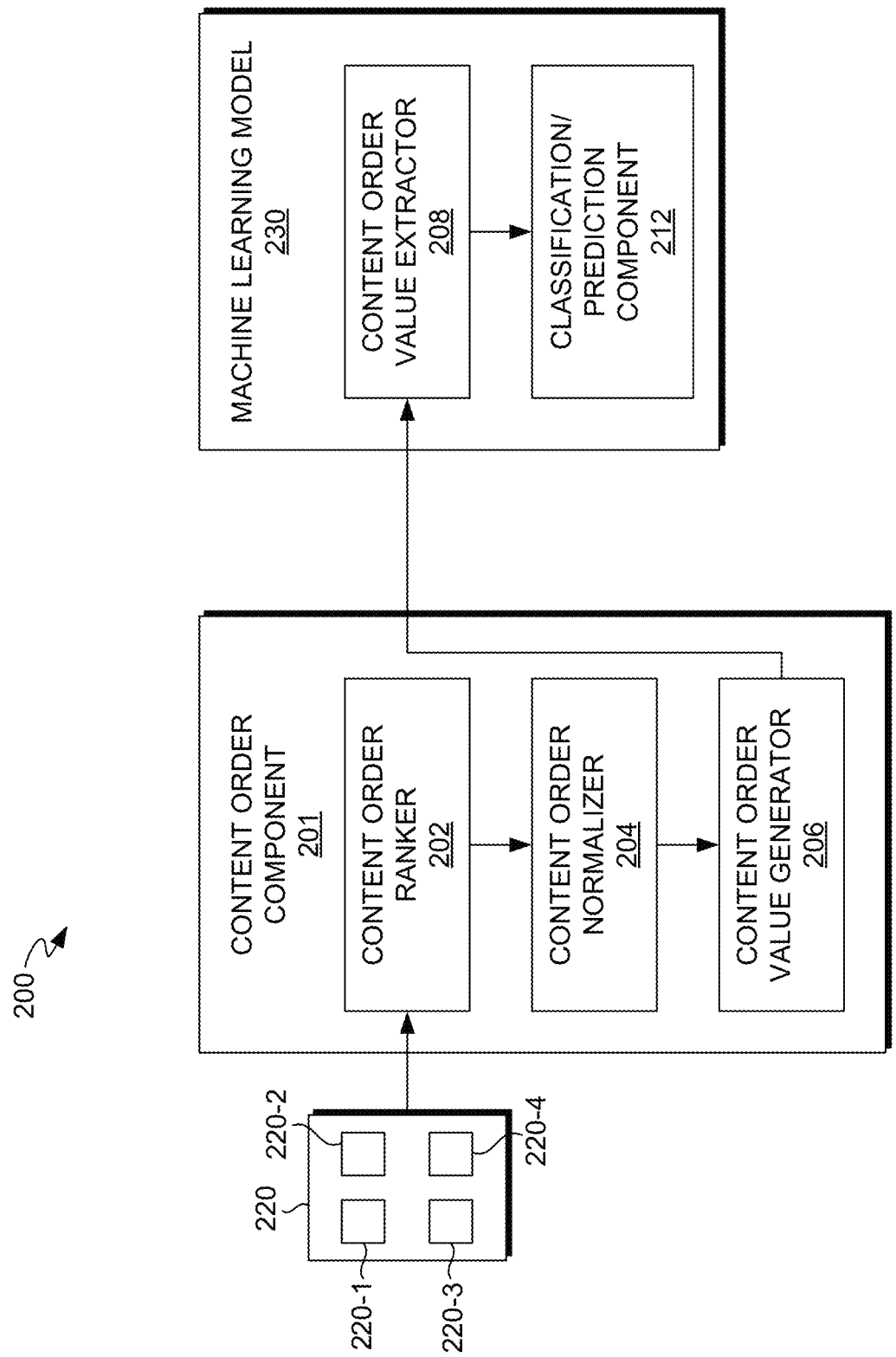
FIG. 2 is a block diagram of a computing system architecture in which aspects of the present disclosure are employed, according to some embodiments.

Referring now to FIG. 2, a block diagram of a system 200, according to some embodiments. FIG. 2 is not intended to be limiting and other arrangements and elements can be used in addition to or instead of those shown in system 100, and some elements may be omitted altogether for the sake of clarity. Further, as with the system 100 of FIG. 1, many of the elements described herein are functional entities that may be implemented as discrete or distributed components or in conjunction with other components, and in any suitable combination and location. The functionality of system 200 may be provided via a software as a service (SAAS) model, e.g., a cloud and/or web-based service. In other embodiments, the functionalities of system 200 may be implemented via a client/server architecture. In some embodiments, there are more or less components than illustrated in the system 200.

The document 220 includes instances 220-1, 220-2, 220-3, and 220-4 (e.g., paragraphs, objects, charts, etc.). The document 220 is fed or provided to the content order component 201 as input. The content order component 201 provides a content order value for each of the instances 220-1 through 220-4 by superimposing or generating the content order values within the document 220 itself. Although the document 220 includes 4 instances, it is understood that this is representative only and that any quantity of instances may exist and that the document 220 can alternatively be an image. In an example illustration, the document 220 can be a page of a peer reviewed journal that includes paragraphs and digital images of graphs and tables, where each of the paragraphs are an instance, and each graph and table are also separate instances. Alternatively, each text character/glyph, image, vector, etc. may also be an instance at a lower level that are encoded with content order values, as illustrated, for example with regard to FIG. 4.

The content order ranker 202 ranks or generates a content order score for each of the instances 220-1 through 220-4. In some embodiments, the content order ranker 202 includes the same or similar functionality of the content order ranker 102 of FIG. 1. In an example illustration of the content order ranker 202, this component scores each instance 220-1 through 220-4 with integers 1, 2, 3, 20, which is indicative of both the order in which the instances should be read (e.g., by a human) and/or processed (e.g., by a machine learning model) and a depth distinguishing indicator (e.g., indicative of Z-order). For example, instance 220-1 may be a first paragraph that is to be read first (score of 1), instance 220-2 may be a second paragraph that is to be read second (score of 2), instance 220-3 may be a foreground instance on the same page as the second instance 220-2 (score of 3), and instance 220-4 may be a background instance behind the foreground instance 220-3 (score of 20). The difference in value between 3 and 20 may be indicative of ensuring that the system does not classify or detect instances 220-3 and 220-4 as the same instance notwithstanding they are close to each other on the same page or in a proximate spatial orientation. Accordingly, the difference in values may be over a threshold such that a machine learning model does not classify or detect the instances to be the same.

The content order normalizer 204 normalizes the values provided by the content order ranker 202. In some embodiments, the content order normalizer 204 is the same or similar to the content order normalizer 104 of FIG. 1. Using the illustration above, for example, the content order normalizer 204 can normalize each of the values 1, 2, 3, and 20 between a range of 0 and 1 (e.g., 0.1, 0.2, 0.3, and 0.9).

The content order value generator 206 generates values within the instances based on the particular normalized content order scores generated by the content order normalizer 204. In some embodiments, the content order value generator 206 is the same or similar to the content order value generator 106 of FIG. 1. Using the illustration above, for example, each of the normalized values 0.1, 0.2, 0.3, and 0.9 can be multiplied by pixel values as described above to generate the content order values. For example, each character sequence (e.g., words or sentences) within the instances 220-1 can be shaded a first color based on the normalized value of 0.1. Likewise, each character sequence within the instance 220-1 can be shaded a second color based on the normalized value of 0.2. Further, the foreground object of the instance 220-3 can be shaded a third color based on the normalized value of 0.3. And the background object of the instance 220-4 can be shaded a fourth color based on the normalized value of 0.9. Alternatively or additionally, in some embodiments, the content order value can be the score or rank itself superimposed or otherwise provided on the document 220. Alternatively or additionally, in some embodiments, the content order value can be some other generated identifier (e.g., a particular symbol) that is superimposed or provided within the document 220. For example, none of the instances 220-1 through 220-4 may be colored, but rather have a generated identifier next to each instance indicative of the rank or score provided by the content order ranker 202.

In some embodiments, in response to the content order value generator 206 generating a content order value for each instance within the document 220, the document 220 is then provided to the machine learning model 230 so that the document 220 can be processed based at least in part on the content order value provided within the document 220. It is understood that although the machine learning model 230 is illustrated as a distinct component from the content order component 201, in some embodiments, the machine learning model 230 alternatively includes the content order component 201 such that the entire system 200 resides in the machine learning model 230.

The content order extractor 208 receives the document 220 with content order values as input into the machine learning model 230 and extracts those values. In some embodiments, the content order extractor 208 is the same or similar to the content order extractor 108 of FIG. 1. Using the illustration above, for example, each color value generated by the content order value generator 206 may be extracted by the content order extractor 208. In some embodiments, the content order extractor 208 uses a data structure, such as a hash table, to map the content order values to labels or scores so that the machine learning model can use the extracted features for predictions. The classification/prediction component 212 makes classifications, predictions and the like. That is, the classification/prediction component 212 learns a target function (f) that maps the input variables or features (X) (e.g., including the content order value) to an output variable (Y). The machine learning model 230 estimates the mapping function (f) of output variables (Y) given input variables (X) or Y=f(X). For example, given the input values corresponding to input features of: content order value, length of instance, position of instance, shape of instance, f is learned in order to classify or detect object instances (e.g., paragraph 1, paragraph 2, chart, background of chart, etc.).

In some embodiments, the machine learning model 230 alternatively or additionally includes other components. For example, in some embodiments, the machine learning model 230 is a supervised machine learning model that includes a training component and training data. For example, a CNN algorithm finds patterns in the training data such that the input features correspond to the target or output (e.g., object detection or classification). The output of the training process is a model to make predictions. Training can include determining or learning values for all weights and bias from labeled data. In supervised learning, for example, machine learning algorithms build a model by minimizing loss. Loss is the penalty for a bad prediction, or more precisely, a value indicating how bad the model's prediction was on a single example. If the model's prediction is perfect, the loss is zero. The goal of training a model is to find a set of weight and biases that have low or no loss. In some embodiments, the content order value or score is used as an input to a machine learning model before any training occurs or uses the input to train on. In an example illustration of training, the machine learning model 230 can identify patterns that a particular input (e.g., content order value) is always classified as X or is always detected to be instance Y, which may be indicative of learning such that any future input of the same input value, causes the prediction to be consistent with the historical learning. In this way, machine learning models can be trained using documents or images with content order values/scores and subsequent to the training, machine learning models can be used to analyze documents.

Figure 3:
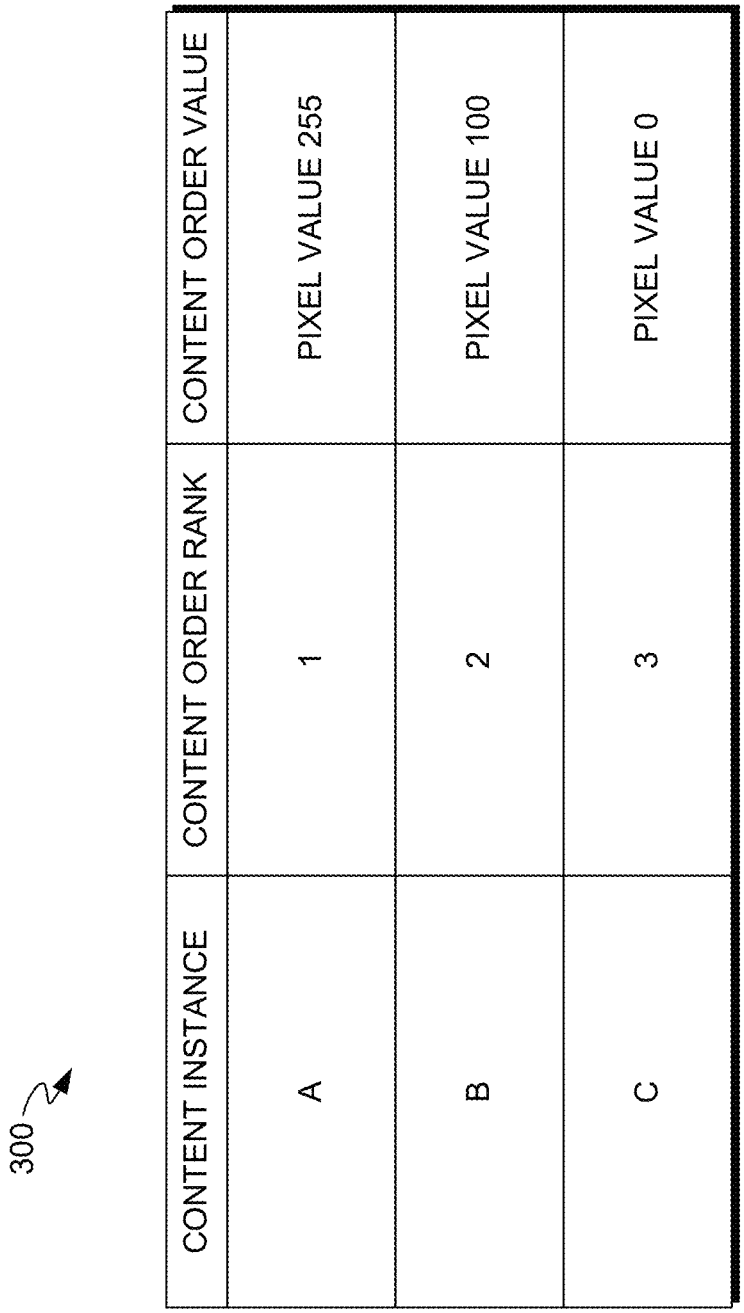
FIG. 3 is a schematic diagram of an example table, according to some embodiments.

FIG. 3 is a schematic diagram of an example table 300, according to some embodiments. In some embodiments, the table 300 represents a data structure (e.g., a hash map) that one or more components use for processing. For example, the content order component 202 of FIG. 2 may use the table 300 to map a particular instance to a particular content order rank and corresponding content order value. In this way, this component can identify particular instances and associate them with particular content order values in order to superimpose the content order values within a document itself. For example, for the first record, instance A may have a content order rank of 1 (e.g., indicative of an order that the instances is oriented within a document) and a corresponding pixel value of 255. Alternatively or additionally, machine learning systems, such as the machine learning model 230 of FIG. 2 can use the table 300 as input for classifying, detecting, or predicting. For example, if each instance of a document contained a value matching a value under the "content instance" column of the table 300, the machine learning model 230 can map the instances to scores and values as indicated in the table 300. Each of these values can then be mapped to targets, labels, or outputs to use as signals for classification, detection, or prediction.

Figure 4:
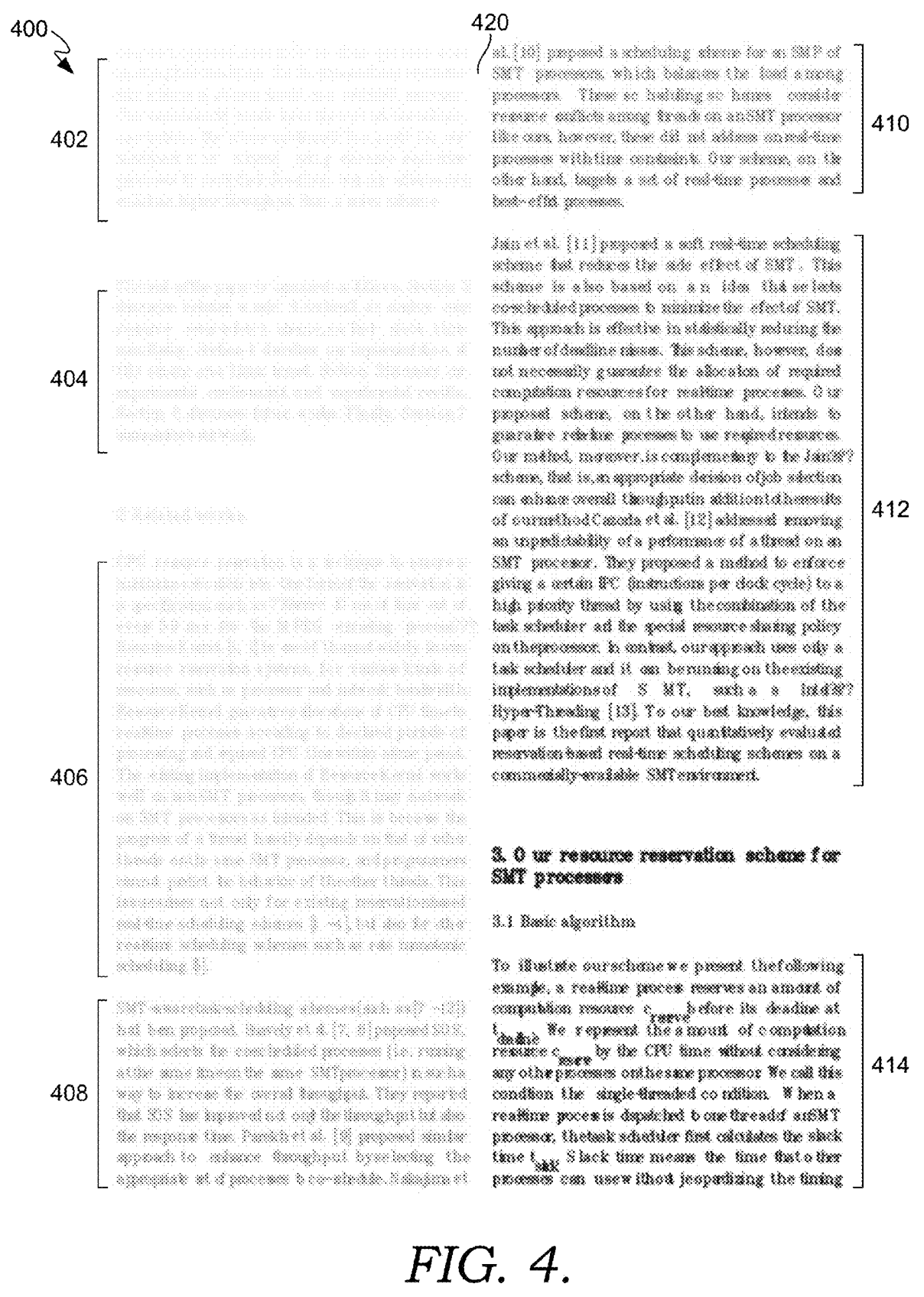

FIG. 4 is a schematic diagram of an example document 400 with various instances, illustrating content order values that are superimposed over the instances, according to some embodiments. The document 400 includes instances 402 through 414, which all represent paragraphs within the document 400 (although the instances can be individual lines of text in this example). As illustrated in FIG. 4, each instance 402 through 414 is encoded (e.g., by the content order value generator 106) in a different color pixel value (RGB), which represents the content order score. The lightest encoded color is the light yellow within instance 402 and the darkest encoded color is the black instance 414. These content order values represent a spectrum or heat map of colors that differ in scale slightly from one instance to the next assuming a top-to-down and left-to-right reading or processing of the instances. As can be seen in FIG. 4, the pixel value smoothly varies over characters in the order in which they appear in the content stream from one line or character of text to the next (not just between each instance indicated in FIG. 4).

The content order value spectrum within FIG. 4 corresponds to the natural language reading order that a human would read each instance. In this way, a machine learning model, such as a vision-based model would not have as much difficulty processing the document 400 compared to existing models. Existing vision-based models, for example, are fed the document 400 without the encoded color content order values. Accordingly, these technologies have difficulty detecting or classifying whether the instances 402 and 410 are two separate instances or just one instance. This is due in part because of the small break in paragraphs indicated by the space 420 and horizontal empty space separating the top two paragraphs from the rest of the document 400. This makes it difficult for computer vision algorithms to determine, for example, if the instance 410 follows the instance 402 or if the instance 404 follows the instance 402. Although the instances 402 and 410 are geometrically adjacent and close together, they are clearly two different paragraphs. Because the content order values are different in color pixel values over a threshold—a light yellow pixel value at 402 compared to a darker orange pixel value at 410 (with 3 pixel values between these instances)—this indicates a strong signal to model to treat these two instances as two separate instances, as opposed to one.

The threshold pixel value difference or any content order value threshold described herein may be any suitable number or rule in order to signal a model to make one classification or prediction versus another. For example, there may be a rule that the greater the difference in content order value between instances, the higher the confidence or probability that the instances are not part of the same instance. Likewise, the closer the content order values are to each other, the higher the confidence or probability that the instances are the same instance. In this manner with respect to FIG. 4, for example, there is a fairly high probability that instance 402 and 410 are not part of the same instance given the difference in the content order values in terms of pixel values.

Figure 5:
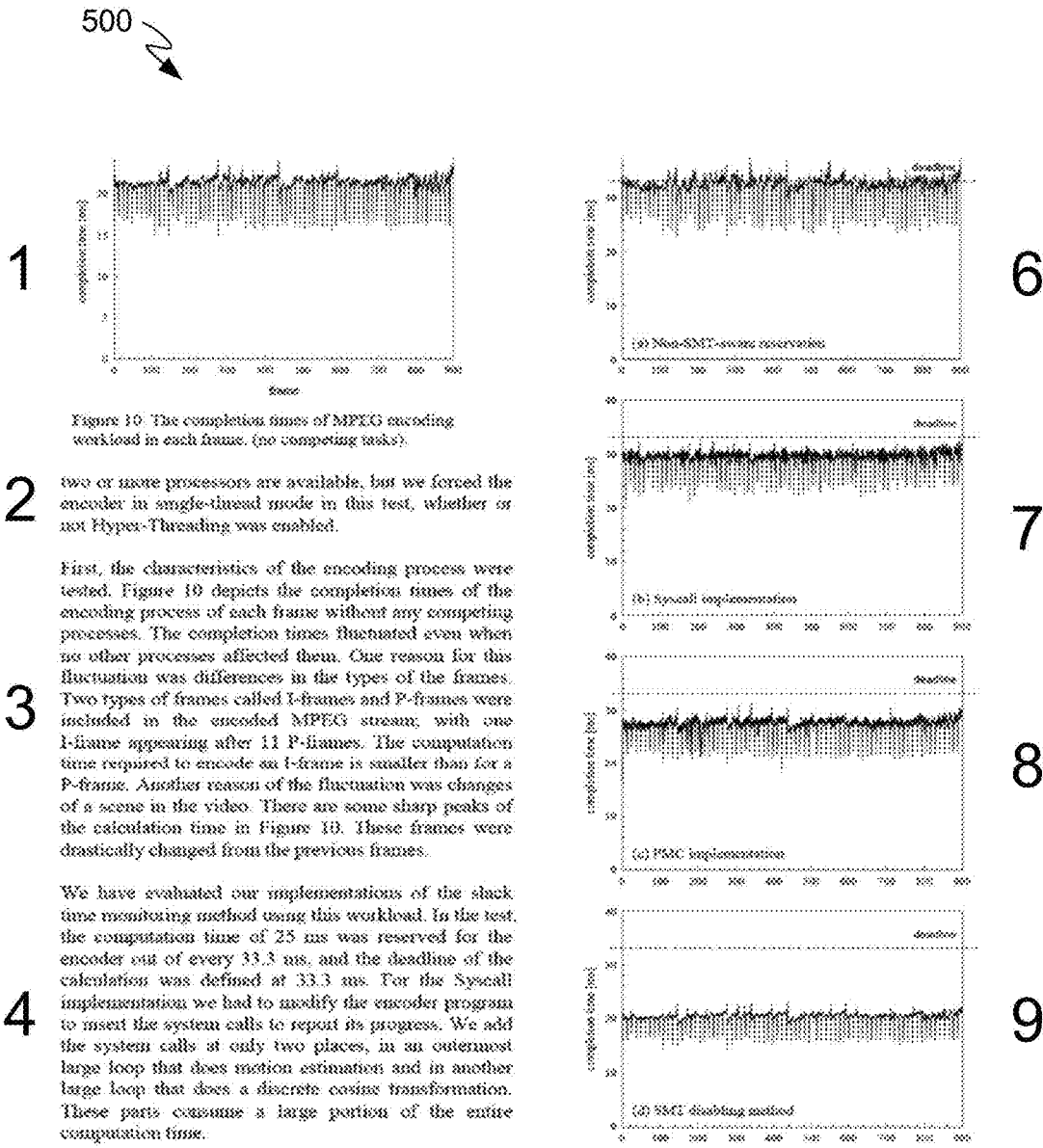
FIG. 5 is a schematic diagram of an example document with various instances, illustrating content order values that are superimposed over the instances, according to some embodiments

FIG. 5 is a schematic diagram of an example document 500 with various instances, illustrating content order values that are superimposed over the instances, according to some embodiments. The document 500 includes instances corresponding to content order values 1 through 9, which all are encoded next to corresponding paragraphs or figures within the document 500. As illustrated in FIG. 5, each instance is encoded (e.g., by the content order value generator 106) with a different integer value (1, 2, 3, 4, 5, 6, 7, 8, or 9), which represents the content order score for that instance. The lowest content order value is 1 and the highest content order value is 9. These content order values represent a range of values that differ in scale slightly from one instance to the next.

The content order value range within FIG. 5 corresponds to the natural language reading order that a human would read each instance. In this way, a machine learning model, such as a vision-based model would not have as much difficulty processing the document 500 compared to existing models. Existing vision-based models, for example, are fed the document 500 without the encoded content order values 1 through 9. Accordingly, these technologies have difficulty detecting or classifying whether the instances corresponding to values 1 and 6, for example, are two separate instances or just one instance. Although these instances are geometrically adjacent, they are clearly two different figures. Because the content order values are different in values over a threshold—a value of 1 compared to a value of 6 (with 4 values between these instances (2-5))—this indicates a strong signal to model to treat these two instances as two separate instances, as opposed to one.

In various embodiments, models may have different rules to determine whether values are content order values or values that are a part of the actual instance itself (e.g., a pixel that is part of an object in an instance). For example, with respect to FIG. 5, there may be a rule indicating that if there is an integer value (e.g., at a particular boldness or font) in the margins or otherwise in a particular position next to the instances of the document 500, these are not object instances themselves but represent content order value features to be used as input to detect an image. In this way, the model does not try to detect or classify the content order values themselves as particular instances but instead uses the content order values to detect or make classifications for associated instances.

Figure 6:
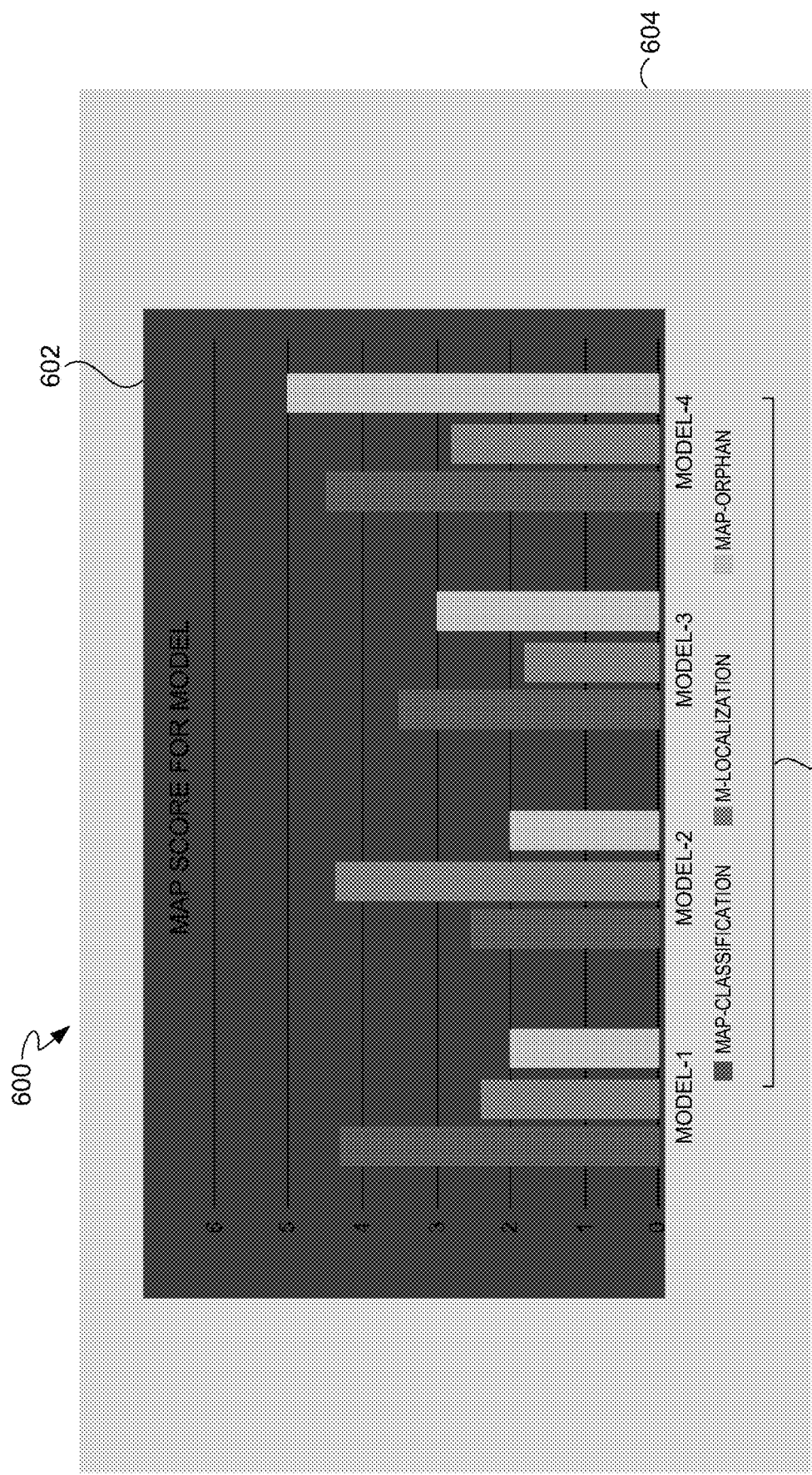
FIG. 6 is a schematic diagram of an example image with various instances, illustrating content order values that are superimposed over the instances, according to some embodiments.

FIG. 6 is a schematic diagram of an example image 600 with various instances, illustrating content order values that are superimposed over the instances, according to some embodiments. The image 600 includes instances 602 through 606, which represent the foreground (instances 602 and 606) and the background (instance 604) within the image 600. As illustrated in FIG. 6, each instance is encoded (e.g., by the content order value generator 106) in a different gray-scale pixel value, which represents the content order score. The lightest encoded color is the instance 604 and the darkest encoded color is the black instance 606. These content order values represent a spectrum or heat map of colors that differ in scale slightly from one instance to the next.

The content order value spectrum within FIG. 6 corresponds to the Z-order of instances within the image 600. In this way, a machine learning model, such as a vision-based model would not have as much difficulty processing the image 600 compared to existing models. Existing vision-based models, for example, are fed the image 600 without the encoded color content order values. Accordingly, these technologies have difficulty detecting or classifying whether the instances 602 and 604, for example, are foreground or background instances and their associated bounds for bounding boxes. Accordingly, for example, existing technologies may generate a bounding box over the entire image 600 indicating that the entire image is a bar graph, as opposed to generating three bounding boxes indicating the foreground or bar graph, the background, and they key. Although these instances are geometrically adjacent and close together, they are clearly different instances. Because the content order values are different in color pixel values over a threshold—a light pixel value at 604 compared to a darker pixel value at 602—this indicates a strong signal to model to treat these two instances as two separate instances, as opposed to one.

Figure 7:
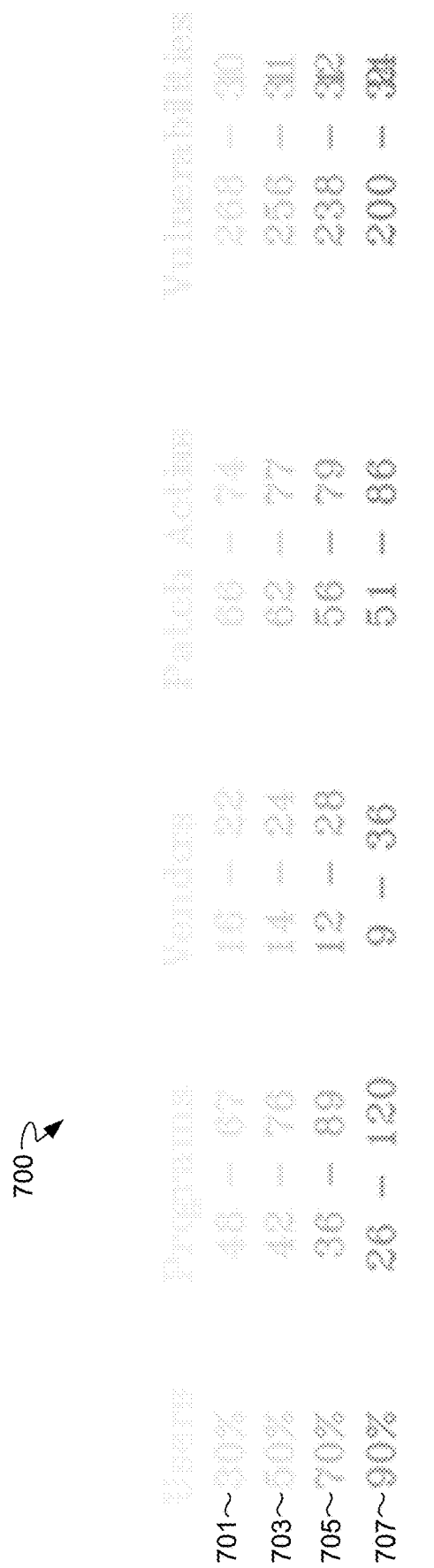
FIG. 7 is a schematic diagram of an example table instance with various instances, according to some embodiments.

FIG. 7 is a schematic diagram of an example table instance 700 with instances 701 through 707. As illustrated in FIG. 7, each instance 701 through 707 is encoded (e.g., by the content order value generator 106) with a color pixel value (gray scale), which represents the content order score. The lightest encoded color is the light gray within instance 701 and the darkest encoded color is the black instance 707. These content order values represent a spectrum or heat map of colors that differ in scale slightly from one instance to the next (going from left to right and top to bottom).

The content order value spectrum within FIG. 7 corresponds to content flow from a left-to-right and top-to-bottom flow, which is a strong signal that the table 700 is a single instance or an open table, as opposed to a set of isolated single instances 701 through 707. In this way, a machine learning model, such as a vision-based model would not have as much difficulty processing the table 700 compared to existing models. Existing vision-based models, for example, are fed the table 700 without the encoded color content order values. Accordingly, these technologies have difficulty detecting or classifying whether the table 700 is a set of individual single line text instances of a tabular layout of text or just one instance—a table. This is due in part because of the small breaks in-between the text. Although the instances 701 through 707 are separated by various breaks, they are clearly a part of the same table. And because the content order values of instances 701 through 707 are all close to each other within a threshold, there is a greater likelihood that a vision-based model will classify or detect these all as the same instance 700.

Figure 8:
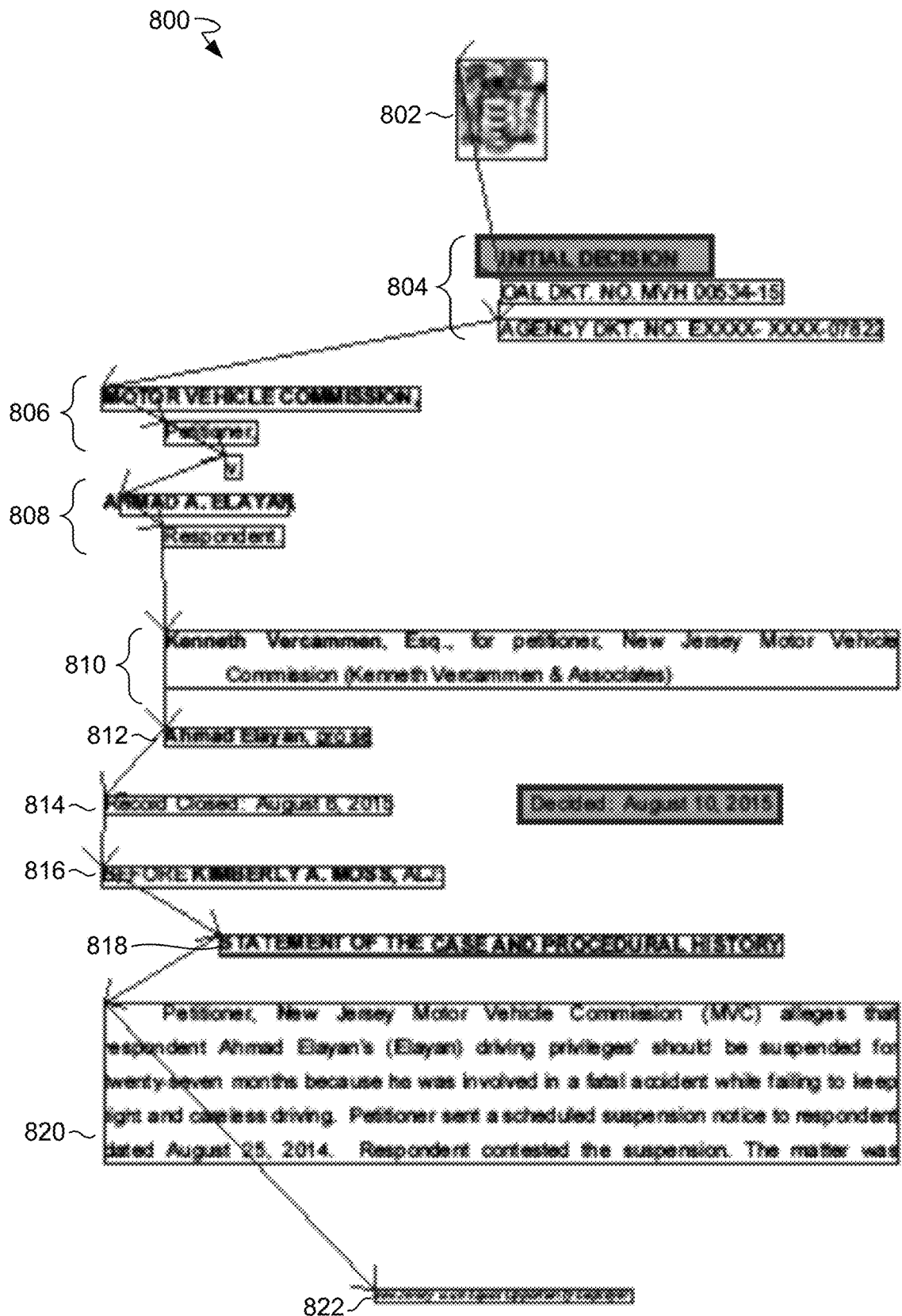
FIG. 8 is a schematic diagram of an example document with various instances illustrating reading order predictions associated based on content order values, according to some embodiments.

FIG. 8 is a schematic diagram of an example document 800 with various instances illustrating content order predictions based on content order values, according to some embodiments. The document 800 includes instances 802 through 822. Each of the instances 802 through 822 may be encoded with an increasingly different content order value starting from the top of the document 800 to the bottom (e.g., a RGB spectrum). The content order value range corresponds to the natural language reading order that a human would read each instance. In this way, a machine learning model, such as a vision-based model would not have as much difficulty processing the document 800 compared to existing models. Existing vision-based models, for example, are fed the document 800 without the encoded content order values. Accordingly, these technologies make errors in reading order predictions, such as processing the instance 820 before the instance 810. Although these instances are geometrically adjacent, they are clearly to be read or processed in a particular order. Accordingly, vision-based models that have content order as an input may, for example, make fewer errors in the order in which instances are processed as indicated by the arrows—that is, instance 802 through 822 are processed one right after another from the top of the page to the bottom of the document 800, which is the way a human would read the document 800. In this way, there is a higher probability that instances will be correctly detected or classified.

Figure 9A:
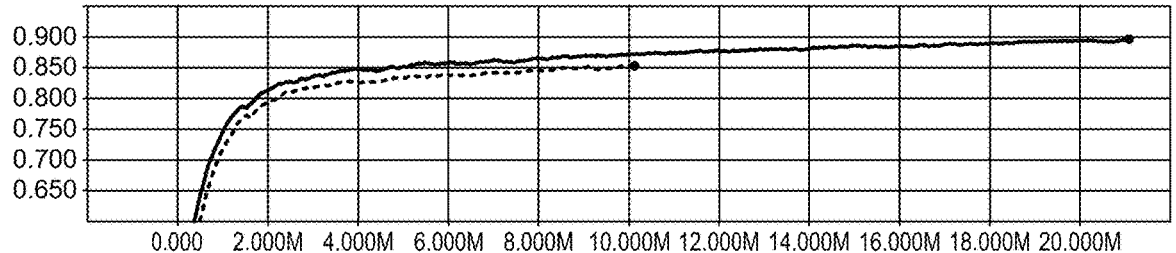
FIG. 9A is a table illustrating classification accuracy comparison between a machine learning model that uses content order as an input feature and a machine learning model that does not use content order as in input feature, according to some embodiments.

FIG. 9A is a table 900 illustrating classification accuracy comparison between a machine learning model that uses content order as an input feature and a machine learning model that does not use content order as in input feature, according to some embodiments. As illustrated in the table 900, the model trained with content order feature as an input, makes classifications at a greater accuracy compared to the other model. The classification metric measures whether the class of object (e.g., text, list-item, footnote, heading, table, figure, etc.) was correctly identified. This graph illustrates that content order values are useful features in making this determination.

Figure 9B:
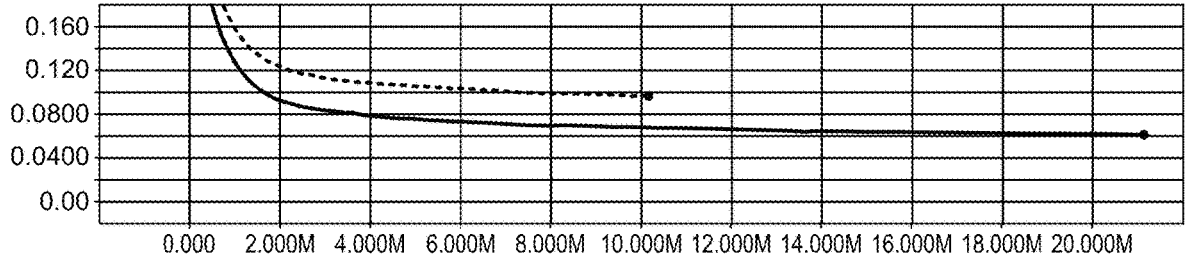
FIG. 9B is a table illustrating localization error comparison between a machine learning model that uses content order as an input feature and a machine learning model that does not use content order as an input feature, according to some embodiments.

FIG. 9B is a table 902 illustrating localization error comparison between a machine learning model that uses content order as an input feature and a machine learning model that does not use content order as an input feature, according to some embodiments. Localization is the estimation of the true location of an object in space in and is characterized by a certain amount of inherent uncertainty and operational bias that results in estimation errors. The goal of localization is to predict the position and orientation of a particular instance or image. For example, a model can predict the location of an instance using a bounding box, but error in its bounding box location, which is a localization error. FIG. 9B illustrates that the model that is trained with content order as an input feature makes significantly lower localization errors compared to other models.

Figure 9C:
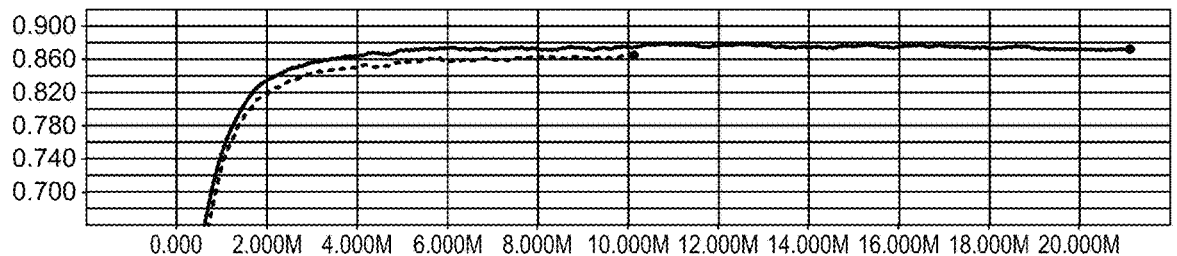
FIG. 9C is a table illustrating Mean Average Precision (mAP(Figure)) comparison between a machine learning model that uses content order as an input feature and a machine learning model that does not use content order as an input feature, according to some embodiments.

FIG. 9C is a table 904 illustrating Mean Average Precision (mAP(Figure)) comparison between a machine learning model that uses content order as an input feature and a machine learning model that does not use content order as an input feature, according to some embodiments. Precision measures how accurate a prediction is. Average precision (AP) computes the average precision value for recall value over 0 to 1. Recall measures how many true positives are found, such as by the formula true positives over true positives plus false negatives. mAP can be calculated by taking the mean AP over all classes. As illustrated in FIG. 9C, the model that uses content order as an input feature more accurately makes predictions.

Figure 9D:
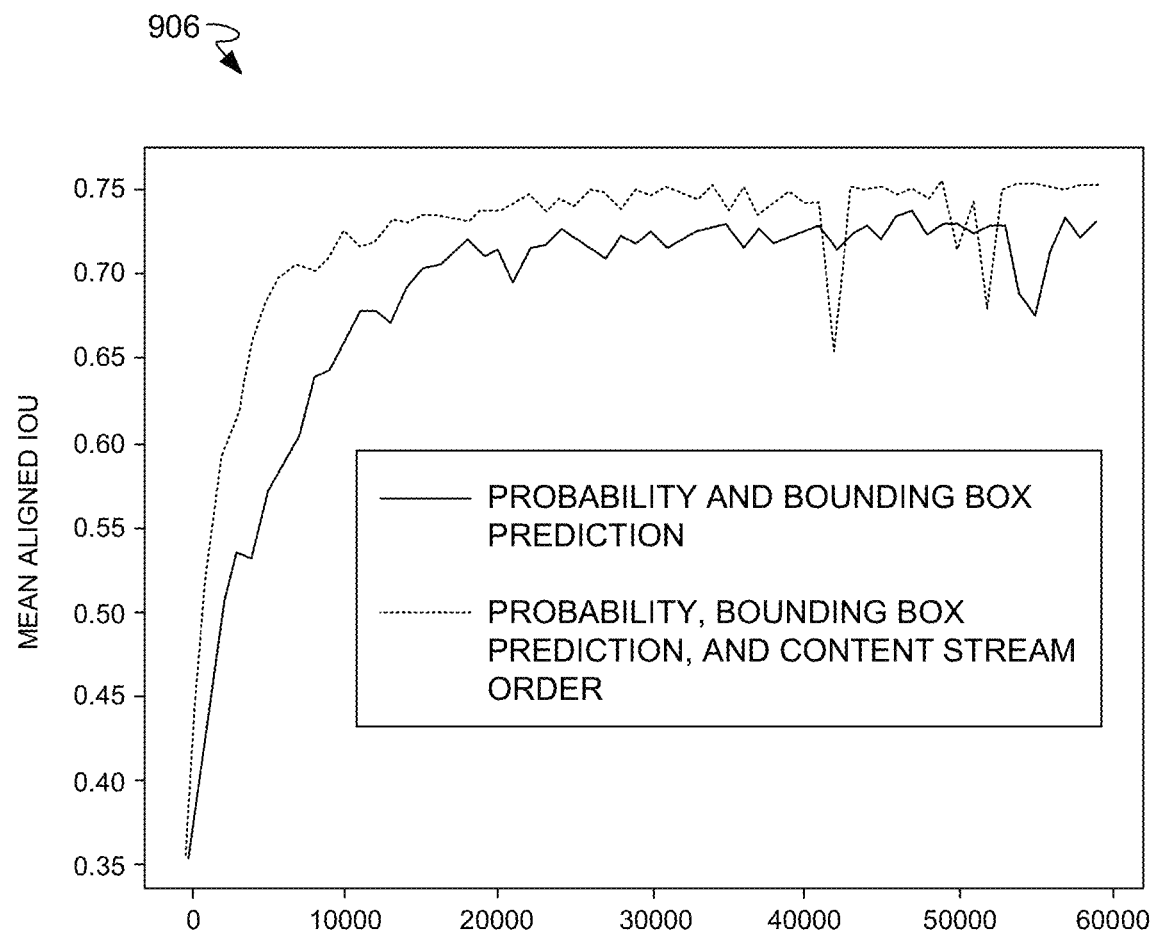
FIG. 9D is a table illustrating validation scores during training of the reading or processing order of a model both with and without content order as a feature input, according to some embodiments.

FIG. 9D is a table 906 illustrating validation scores during training of the reading or processing order of a model both with and without content order as a feature input, according to some embodiments. "IOU" corresponds to "Intersection over union," which measure the overlap between two boundaries (e.g., bounding boxes). It is the ratio of overlapping area of ground truth and predicted area to the total area, which can then be converted to a mean. As illustrated in FIG. 9D, the model that uses content order as input improves training or improves bounding box prediction over most of the training iterations as illustrated in the table 906.

Exemplary Flow Diagrams

Figure 10:
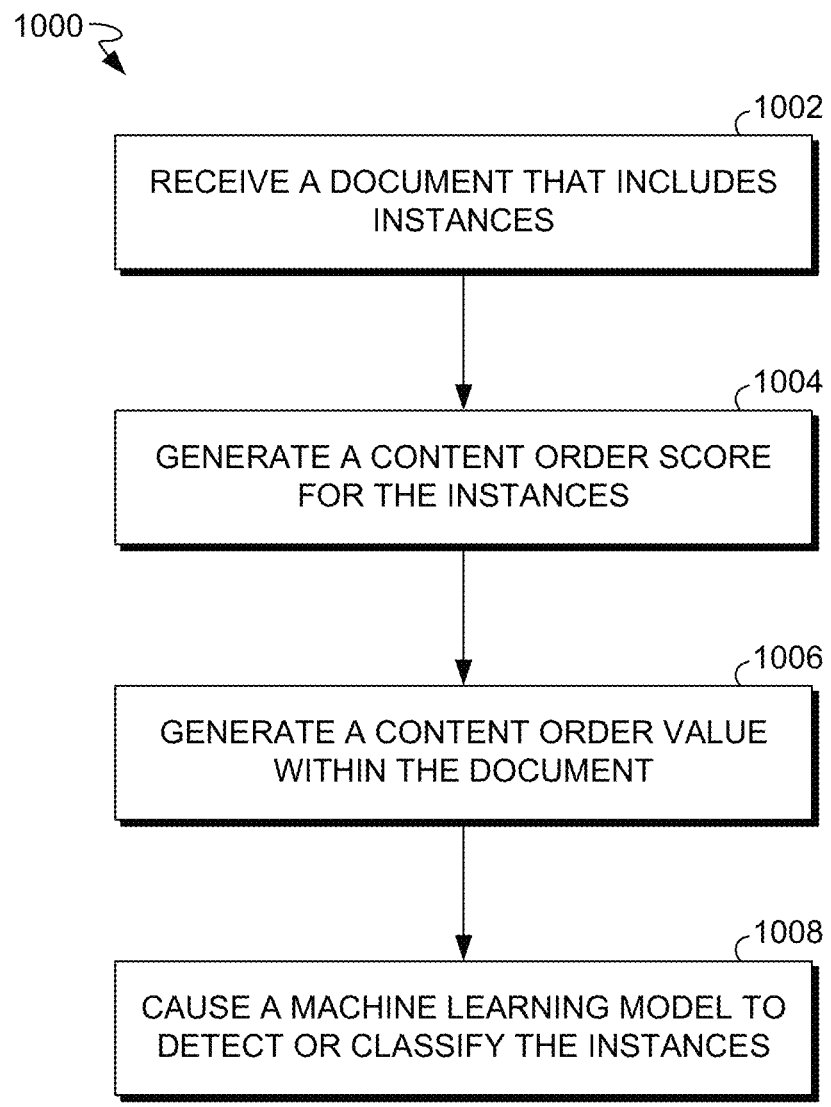
FIG. 10 is a flow diagram of an example process for causing a machine learning model to detect or classify instances based at least in part on a content order score of the instances, according to some embodiments.

FIG. 10 is a flow diagram of an example process 1000 for causing a machine learning model to detect or classify instances based at least in part on a content order score of the instances, according to particular embodiments. The process 1000 (and/or any of the functionality described herein may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments, certain blocks are removed, such as block 1006. Added blocks may include blocks that embody any functionality described herein (e.g., as described with respect to FIG. 1 through FIG. 9D). The computer-implemented method, the system (that includes at least one computing device having at least one processor and at least one computer readable storage medium), and/or the computer readable medium as described herein may perform or be caused to perform the process 1000 or any other functionality described herein.

Per block 1002 a document that includes a plurality of instances is received (e.g., by the content order ranker 102, 202). In some embodiments, the plurality of instances include a foreground instance and a background instance. For example, referring back to FIG. 6, the instances may be the instances 602 and 604. In some embodiments, the plurality of instances alternatively or additionally include a first paragraph instance and a second paragraph instance where the first paragraph instance and the second paragraph instance are not part of the same paragraph. For example, referring back to FIG. 4, the instances may include the instance 402 and the instance 410. In some embodiments, the plurality of instances alternatively or additionally include a first single line text and a second single line text, such as for example, the instances 701 and 703 of FIG. 7.

Per block 1004, a content order score is generated (e.g., by the content order ranker 102, 202, which can both be a content order ranker means) for the instances. For example, a content order score can be generated for each instance of the plurality of instances where the content order score is at least partially indicative of an order that a respective instance is oriented within the document (e.g., as illustrated in FIG. 4). Alternatively, the content order score can at least partially correspond to an indication of a particular quantity of difference between each instance of the plurality of instances. For example, referring back to FIG. 4, there is a particular pixel value of difference between the instance 402 and 410, which may correspond to a threshold so that a determination can be made that the instance 402 and 410 do not belong to the same instance. In some embodiments, the content order score is not generated based on whether the plurality of instances are geometrically adjacent to each other. Put another way, the particular quantity of difference between instances can be made without regard to the spatial orientation similarity between instances in case, for example, a foreground and background object, which are spatially close, are desired to not be classified as the same instance. Accordingly, a content order score for a foreground different may be relatively different over a threshold than a background object in order to classify the instances as separate instances. In these embodiments, the closer the content order score between instances, the closer the relationship or more likely instances will be classified the same and vice versa. In some embodiments, the generating of a content order score can be or include receiving the score for each instance manually.

In some embodiments, the content order score includes a score that indicates a Z-value between the foreground instance and the background instance such that a machine learning model detects the foreground instance and the background instances as two instances. For example, referring back to FIG. 6, there can be depth value differences between the instance 602 and 604 such that a model detects that these are two separate instances as opposed to on.

In some embodiments, the content order score indicates that a first paragraph instance and a second paragraph instance differ over a threshold such that a machine learning model detects the first paragraph instance and the second paragraph instance as two different instances. For example, referring back to FIG. 4, the instances 402 include yellow pixel values, whereas the instance 410 include orange pixel values. Because the instance 410 does not also include yellow pixel values (the threshold in this example), the machine learning model gets a strong signal that these two instances are not the same instance.

In some embodiments, the content order score indicates that a first single line text and a second single line text are within a threshold such that a machine learning model detects the first single line text and the second single ling text as a single instance. For example, referring back to FIG. 7, the machine learning model may detect the instance 701 and 703 (and the rest of the instances 705 and 707) as the same table instance based at least in part on the pixel values between within a value threshold.

Per block 1006, a content order value is generated (e.g., by the content order value generator 106) within the document. In particular embodiments, based on the generating of the content order score, a content order value is generated for each instance within the document. In some embodiments, the content order value is an indicator to a machine learning model to process the each instance according to the order that the respective instance is oriented in. For example, referring back to FIG. 4, the pixel values may be an indicator to a machine learning model to process the instances in a particular order.

In some embodiments, the content order value includes a RGB scale or gray-scale color pixel value for each character sequence or symbol within each object instance such that the document includes the plurality of instances that are each represented by a different color. For example, this is described with respect to FIGS. 4, 6, 7, and 8.

In some embodiments, the content order value alternatively or additionally includes other values, such as natural language text or real numbers (e.g., integers), as is described with respect to FIG. 5, for example. In some embodiments, the content order value need not be superimposed or encoded directly on to a document. Rather, the content order value (or content order score) can simply be provided to a machine learning model to make predictions.

Per block 1008, a machine learning model is caused (e.g., by the classification/prediction component 112 or the content order component 201, which can be a classification or prediction means) to detect or classify the plurality of instances. In some embodiments, based at least in part on the generating of the content order value, the document that contains the content order values is provided or fed as input into a machine learning model. The machine learning model detects or classifies the plurality of instances based at least in part on the content order value. For example, referring back to FIG. 2, the content order component 201 can provide the document 220 with the generated content values to the machine learning model 230, thereby causing the machine learning model 230 to classify or detect each instance within the document 220. Alternatively or additionally, in some embodiments, based at least in part on the generating of the content order score for each instance, a machine learning model can be caused to detect or classify each instance. For example, the scores can correspond to the integers passed with the document 500 of FIG. 5. In some embodiments, machine learning models only need indications of content order scores without content order values to make predictions.

According to various embodiments, the machine learning model can be any suitable model to make predictions. For example, the machine learning model can be an object detection deep neural network, a CNN, or any other suitable vision-based model tasked with document structure detection, identification, and/or classification. Object detection algorithms identify and locate (e.g., via spatial coordinates) all instances in a document or image based on learning from a collection of instance categories. The algorithm takes a document or image with content order value/score as input and outputs the category or label that each instance belongs to, along with a confidence score that it belongs to the category. The algorithm also predicts the instance's location and scale with a bounding box.

In an example of how a model can make predictions using content order as input per block 1008, the following illustrations are provided. In some embodiments, a Region-based Convolutional Network (RCNN) is used. In these embodiments, the algorithm proposes various boxes (or regions) in the image or document and checks to see if any of the boxes contain an instance. There are typically four regions that form an instance or object—scales, texture, colors, and enclosure (e.g., whether instance is in background or foreground). RCNN uses selective search to identify these patterns in the document/image and based on the patterns, propose various regions. First the model takes the document/image with content order as input. Then system generates sub-segmentations that form multiple regions. The system then combines similar regions to form a larger regions. In some embodiments, this combining is based on the content order value similarity, the color similarity, texture similarity, size similarity, and/or shape compatibility between regions. For example, regions that have the same or similar (within a threshold) content order value can be combined, along with similar shape. Finally, these regions then produce the final object locations or the region of interest. In this way, content order can be used as a particular signal that a machine learning system uses to make detections of the location of objections and associated classifications.

The RCNN or other machine learning algorithms use various training and learning techniques to make classifications or detections. For example, in some embodiments the system first receives a pre-trained CNN. Then the model can be retrained by training the last layer of the network based on the number of classes that need to be detected (e.g., paragraph instance, foreground, background, etc.). Then a region of interest is captured for each document and all the regions can be reshaped so that they match the CNN input size of the document. After getting these regions, a Support Vector Machine (SVM) can be trained to classify or detect objects and background (e.g., based at least in part on the content order). Finally, a linear regression or other model can be trained to generate tighter bounding boxes for each instance in the image. In this way, bounding boxes can change in shape and confidence levels for classification can be increased based on increased training sessions.

In another example illustration of how detections or classifications can be made per block 1008, a CNN can be used. Various categories, labels, or classifications can first be identified, such as whether an instance is a "paragraph," "table," "foreground graph," "background of the foreground graph," etc. The neural network can include a convolutional layer, a pooling layer, and a fully connected layer. The machine learning model neural network may be fed or receive as input one or more images or documents at the convolutional layer, along with content order values/scores. Each input image or document can be transformed into a 2-D input vector array of values, such as integers of ones and zeroes. Each value represents or describes a particular pixel of the image and the pixel's intensity. For instance, each line or edge of a paragraph or other instance in the image can be denoted with a one and each non-line can be represented with zeroes. The convolutional layer utilizes one or more filter maps, which each represent a feature (e.g., a paragraph instance) of the input image (e.g., a word document with pictures). There may be various features of an image and thus there may be various linearly stacked filter maps for a given image. A filter map is also an array of values that represent sets of pixels and weights where a value is weighted higher when it matches a corresponding pixel or set of pixels in the corresponding section of the input image. For example, content order value pixel values that are within a threshold can be weighted higher compared to other values. The convolution layer includes an algorithm that uses each filter map to scan or analyze each portion of the input image. Accordingly, each pixel of each filter map is compared and matched up against a corresponding pixel in each section of the input image and weighted according to similarity. In some embodiments, the convolutional layer performs linear functions or operations to arrive at the filter map by multiplying each image pixel value with its own value and then performing a summation function of each product, which is then divided by the total quantity of pixels in the image feature.

In particular embodiments, the pooling layer reduces the dimensionality or compresses each feature map by picking a window size (i.e., a quantity of dimensional pixels that will be analyzed in the feature map) and selecting the maximum value of all of the values in the feature map as the only output for the modified feature map. In some embodiments, the fully connected layer maps votes for each pixel (e.g., including content order value pixels) of each modified feature to each classification (e.g., paragraph, table, foreground graph, background of graph, etc.). The vote strength of each pixel is based on its weight or value score. The output is a score (e.g., a floating point value, where 1 is a 100% match) that indicates the probability that a given input image or set of modified features fits within a particular defined class). For example, an input image may include several paragraphs marked by content order values similar to FIG. 4. The classification types may be "paragraph," "picture X," "table," and the like. After the image is fed through each of the layers, the output may include a floating point or other confidence value for each classification type that indicates the probability or confidence level that the particular classification type exists in a particular area, which can be based at least in part on content order. For example, the output of a CNN or any other machine learning system described herein can be one or more bounding boxes over each instance in the image/document where each bounding box includes the classification prediction (e.g., this instance is a paragraph) and the confidence level (e.g., 90% probability), which can both be generated at least in part on content order, as described above.

Training or tuning of the CNN or any machine learning model can include minimizing a loss function between the target variable or output (e.g., 0.90) and the expected output (e.g., 100%). Accordingly, it may be desirable to arrive as close to 100% confidence of a particular classification as possible so as to reduce the prediction error. This may happen overtime as more training images/documents and baseline data sets are fed into the learning models so that classification/detection can occur with higher prediction probabilities. Accordingly, in some embodiments, block 1008 represents tuning or training, which is done in various stages (e.g., a first stage and a second stage) to reduce prediction error. In these embodiments for example, a first training set can be created (e.g., a first document with content order values) and training can occur in a first stage using the first training set and then a second training set can be created (e.g., a first document with other content order values) and training can occur in a second stage using the second training set to reduce error rate or tune the model. In other embodiments, the prediction at block 1008 represents prediction on a deployed model that has already been trained.

It is noted that although block 1008 is indicative of detecting or classifying instances, the prediction at block 1008 may alternatively or additionally be predicting an order in which each instance of the plurality of instances are to be read in. The term "read" in this manner can refer to natural language reading order (e.g., left-to-right) that humans would typically read a document. Alternatively reading can be indicative of how a processor or other component reads data. Such embodiments are described with respect to "reading order" such as indicated with respect to FIG. 8. For example, referring back to FIG. 8, it can be predicted that the instance 802 is to be read at a first time and the instance 804 is to be read at a second time subsequent to the first time. In some embodiments, the algorithm for the "content order ranker means" and the "classification or prediction means" as described herein are described with respect to blocks 1006 and 1008 of FIG. 10 (or more broadly blocks 1002 through 1008).

In some embodiments, in response to or based at least in part on the detection/classification at block 1008, the machine learning model generates a modified document (or modified portions of the document) and renders the document, which reflects the detection/classification. For example, the modification can include generating bounding boxes and/or description of objects or other instances in the document received at block 10002. In an illustrative example, the rending can include a bounding box that is generated over a paragraph with the values "paragraph" indicating that a particular instance is a paragraph. In some embodiments, the modification includes removing the content order values that were placed in the document for detection/classification so that the document appears cleaner.

Exemplary Operating Environments

Figure 11:
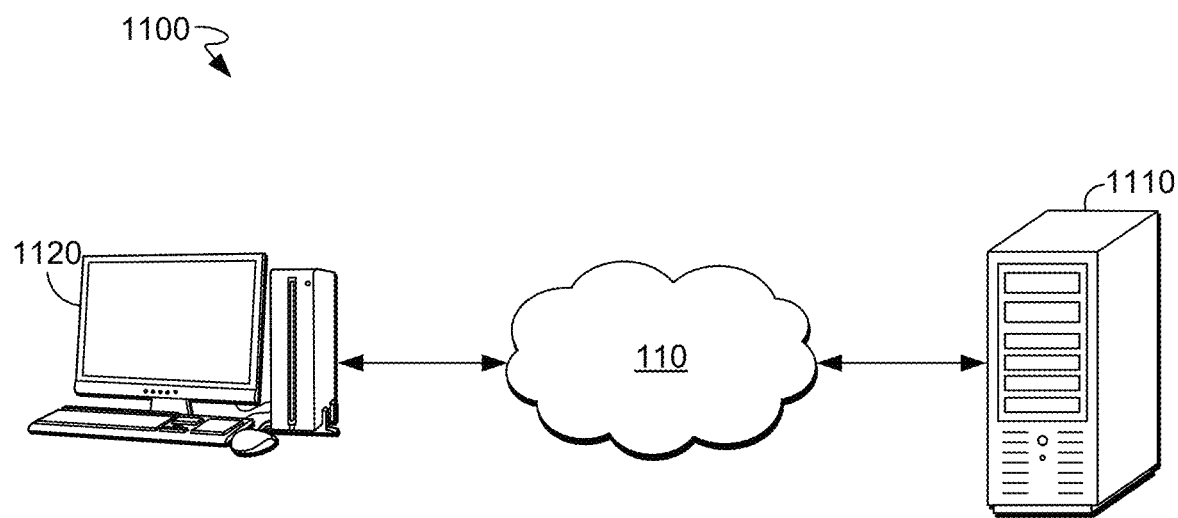
FIG. 11 is an example computer environment in which aspects of the present disclosure are employed, according to some embodiments.

Turning now to FIG. 11, a schematic depiction is provided illustrating an example computing environment 1000 for making predictions or classifications based at least in part on content order, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 110 that represent nodes in a cloud computing network. Various functions described herein as being performed by one or more entities may be carried out by hardware, firmware, and/or software. For instance, various functions may be carried out by a processor executing instructions stored in memory.

The environment 1100 depicted in FIG. 11 includes a prediction server ("server") 110 that is in communication with a network 110. The system 100 further includes a client device ("client") 1120 that is also in communication with the network 110. Among other things, the client 1120 can communicate with the server 1110 via the network 110, and generate for communication, to the server 1110, a request to make a detection, prediction, or classification of one or more instances of a document/image. The request can include, among other things, a document with content order values. In various embodiments, the client 120 is embodied in a computing device, which may be referred to herein as a client device or user device, such as described with respect to the computing device 1200 of FIG. 12.

In some embodiments, each component in FIG. 1 or 2 is included in the server 1110 and/or the client device 1120. Alternatively, in some embodiments, the components of FIG. 1 or 2 are distributed between the server 1110 and client device 1120.

The server 1110 can receive the request communicated from the client 1120, and can search for relevant data via any number of data repositories to which the server 1110 can access, whether remotely or locally. A data repository can include one or more local computing devices or remote computing devices, each accessible to the server 1110 directly or indirectly via network 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 1110 is embodied in a computing device, such as described with respect to the computing device 1200 of FIG. 12.

The server 110 can employ a variety of natural language processing, machine learning, text analysis, context extraction, and/or other techniques for evaluating the document received from the client device 120. In various embodiments, the server 1110 can detect or predict instances of a document or image (e.g., based at least in part on content order). The prediction can then be communicated to the requesting client 1120, which can cause the client 1120 to provide for display the scores and/or one or more predictions associated with the input as a result to the received request.

Figure 12:
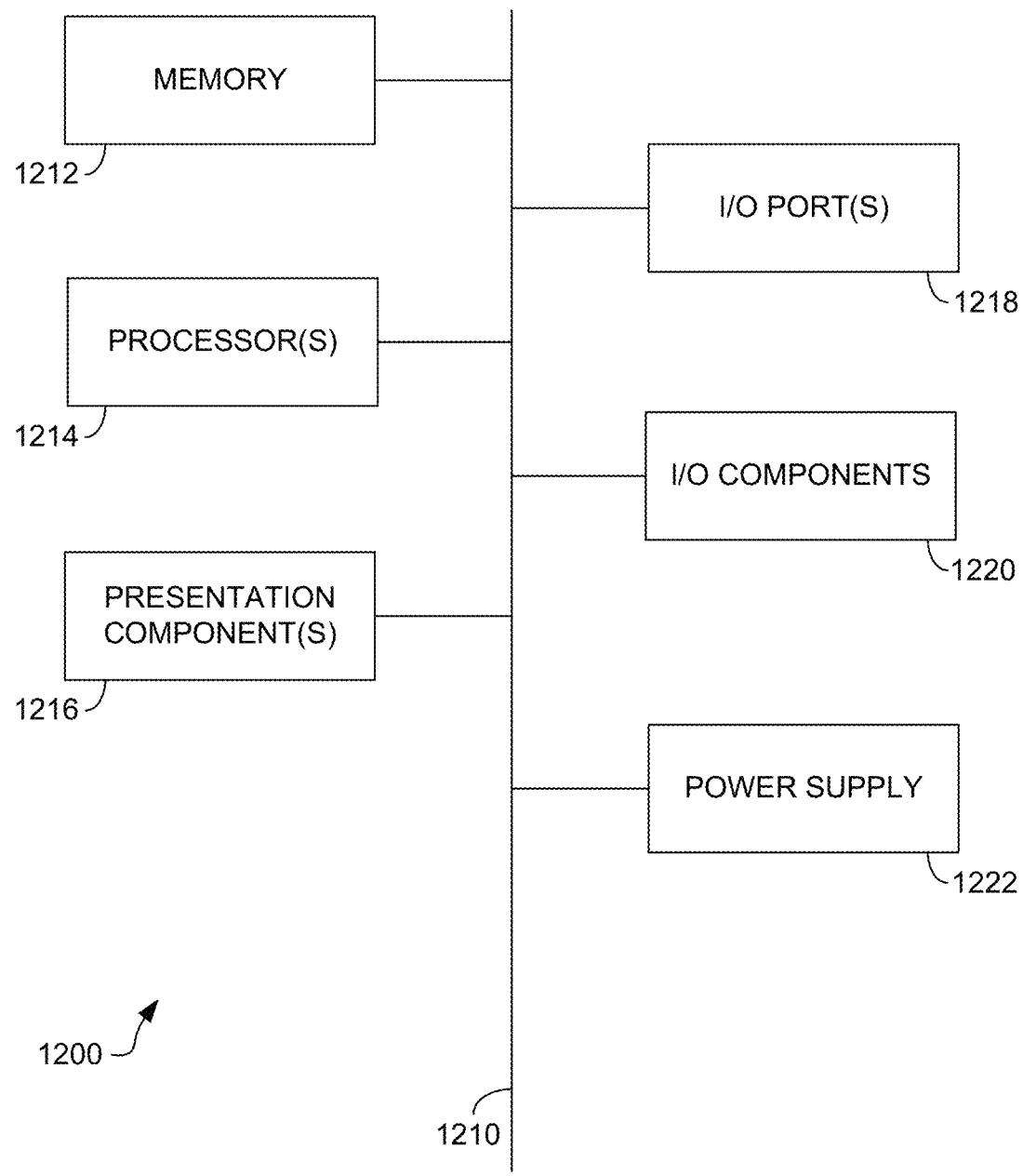
FIG. 12 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

Looking now to FIG. 12, computing device 1200 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1200 represents the client device 1120 and/or the server 1110 of FIG. 11.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 1000 of FIG. 10 or any functionality described with respect to FIGS. 1 through 11.

I/O ports 18 allow computing device 1200 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be equipped with depth cameras, such as stereoscopic camera systems, infrared camera systems, RGB camera systems, touchscreen technology, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer readable medium storing computer-usable instructions that, when used by one or more processors, cause the one or more processors to perform operations comprising:

receiving a document, the document includes a plurality of instances;

generating a content order score for each instance of the plurality of instances, each content order score is at least partially indicative of an order that a respective instance, of the plurality of instances, is oriented within the document;

based on the generating of the content order score for each instance of the plurality of instances, generating, within the document, a content order value for each instance, of the plurality of instances, each content order value being an indicator to a machine learning model to process the respective instance according to the content order value; and based at least in part on the generating of the content order value for each instance, providing the document with the content order value for each instance as in input into the machine learning model, wherein the machine learning model detects or classifies the plurality of instances based at least in part on the content order value for each instance, of the plurality of instances.

2. The non-transitory computer readable medium of claim 1, wherein the content order value includes a Red-Green-Blue scale or grey-scale color pixel value for each character sequence or symbol within the each instance, and wherein the document includes the plurality of instances that are each represented by a different color.

3. The non-transitory computer readable medium of claim 1, wherein the plurality of instances include a foreground instance and a background instance, and wherein the content order score includes a score that indicates a z-value between the foreground instance and the background instance such that the machine learning model detects the foreground instance and the background instance as two different instances.

4. The non-transitory computer readable medium of claim 1, wherein the plurality of instances include a first paragraph instance and a second paragraph instance, the first paragraph instance and the second paragraph instance being two paragraphs that are not part of a same paragraph, and wherein the content order score indicates that the first paragraph instance and the second paragraph instance differ over a threshold such that the machine learning model detects the first paragraph instance and the second paragraph instance as two different instances and the reading order of the first paragraph instance and the second paragraph instance.

5. The non-transitory computer readable medium of claim 1, wherein the machine learning model is an object detection deep neural network.

6. The non-transitory computer readable medium of claim 1, wherein the plurality of instances include a first single line text and a second single line text, and wherein the content order score indicates that the first single line text and the second single line text are within a threshold such that the machine learning model detects the first single line text and the second single line text as a single instance.

7. The non-transitory computer readable medium of claim 1, wherein the content order score is not generated based on whether the plurality of object instances are geometrically adjacent to each other.

8. A computer-implemented method comprising:
receiving a document, the document includes a plurality of instances;
generating a content order score for each instance of the plurality of instances, each content order score is at least partially indicative of an order that a respective instance, of the plurality of instances, is oriented within the document;
based on the generating of the content order score for each instance of the plurality of instances, generating, within the document, a content order value for each instance of the plurality of instances;
based at least in part on the generating of the content order value within the document for each instance, causing a machine learning model to detect or classify each instance.

9. The method of claim 8, wherein the content order value includes a Red-Green-Blue scale or grey-scale color pixel value for each character sequence or symbol within the each instance, and wherein the image includes the plurality of instances that are each represented by a different color.

10. The method of claim 8, wherein the plurality of instances include a foreground instance and a background instance, and wherein the content order value indicates a z-value between the foreground instance and the background instance such that the machine learning model detects the foreground instance and the background instance as two different instances.

11. The method of claim 8, wherein the plurality of instances include a first paragraph instance and a second paragraph instance, the first paragraph instance and the second paragraph instance being two paragraphs that are not part of a same paragraph, and wherein the content order score indicates that the first paragraph instance and the second paragraph instance differ over a threshold such that the machine learning model detects the first paragraph instance and the second paragraph instance as two different instances.

12. The method of claim 8, wherein the machine learning model is an object detection deep neural network.

13. The method of claim 8, wherein the plurality of instances include a first single line text and a second single line text, and wherein the content order score indicates that the first single line text and the second single line text are within a threshold such that the machine learning model detects the first single line text and the second single line text as a single instance.

14. The method of claim 8, wherein the content order score is not generated based on whether the plurality of object instances are geometrically adjacent to each other.

15. A computerized system, the system comprising:
a content order ranker means is configured for generating a content order score for each object of a plurality of objects located in an input document, each content order score is at least partially indicative of an order that a respective object is oriented within the input document;
wherein the content order ranker means is further configured for generating a content order value for each object of the plurality of objects within the document based on the content order score, wherein each of generated content order values comprises an indicator of an order in which a respective object of the plurality object is processed by the system; and
a classification or prediction means is configured for detecting each object based at least in part on the generating of the content order value for each object of the plurality of objects.

16. The system of claim 15, wherein the content order value includes a Red-Green-Blue scale or grey-scale color pixel value for each character sequence or symbol within the each object, and wherein the image includes the plurality of objects that are each represented by a different color.

17. The system of claim 15, wherein the plurality of objects include a foreground object and a background object, and wherein the content order value indicates a z-value between the foreground object and the background object such that the machine learning model detects the foreground object and the background object as two different objects.

18. The system of claim 15, wherein the plurality of objects include a first paragraph object and a second paragraph object, the first paragraph object and the second paragraph object being two paragraphs that are not part of a same paragraph, and wherein the content order value indicates that the first paragraph object and the second paragraph object differ over a threshold such that the machine learning model detects the first paragraph object and the second paragraph object as two different objects.

19. The system of claim 15, wherein the machine learning model is an object detection deep neural network.

20. The system of claim 15, wherein the content order value is not generated based on whether the plurality of objects are geometrically adjacent to each other.

* * * * *

UNITED STATES PATENT AND TRADEMARK OFFICE
CERTIFICATE OF CORRECTION

| | |
|---|---|
| PATENT NO. | : 11,508,173 B2 |
| APPLICATION NO. | : 16/669144 |
| DATED | : November 22, 2022 |
| INVENTOR(S) | : Ashutosh Mehra et al. |

It is certified that error appears in the above-identified patent and that said Letters Patent is hereby corrected as shown below:

In the Specification

Column 26, Line 30-31: In the line reading "of an order in which a respective object of the plurality object is processed by the system; and" should read --of an order in which a respective object of the plurality of objects is processed by the system; and--

Signed and Sealed this
Twenty-first Day of March, 2023

Katherine Kelly Vidal
*Director of the United States Patent and Trademark Office*